United States Patent Office 3,389,989
Patented June 25, 1968

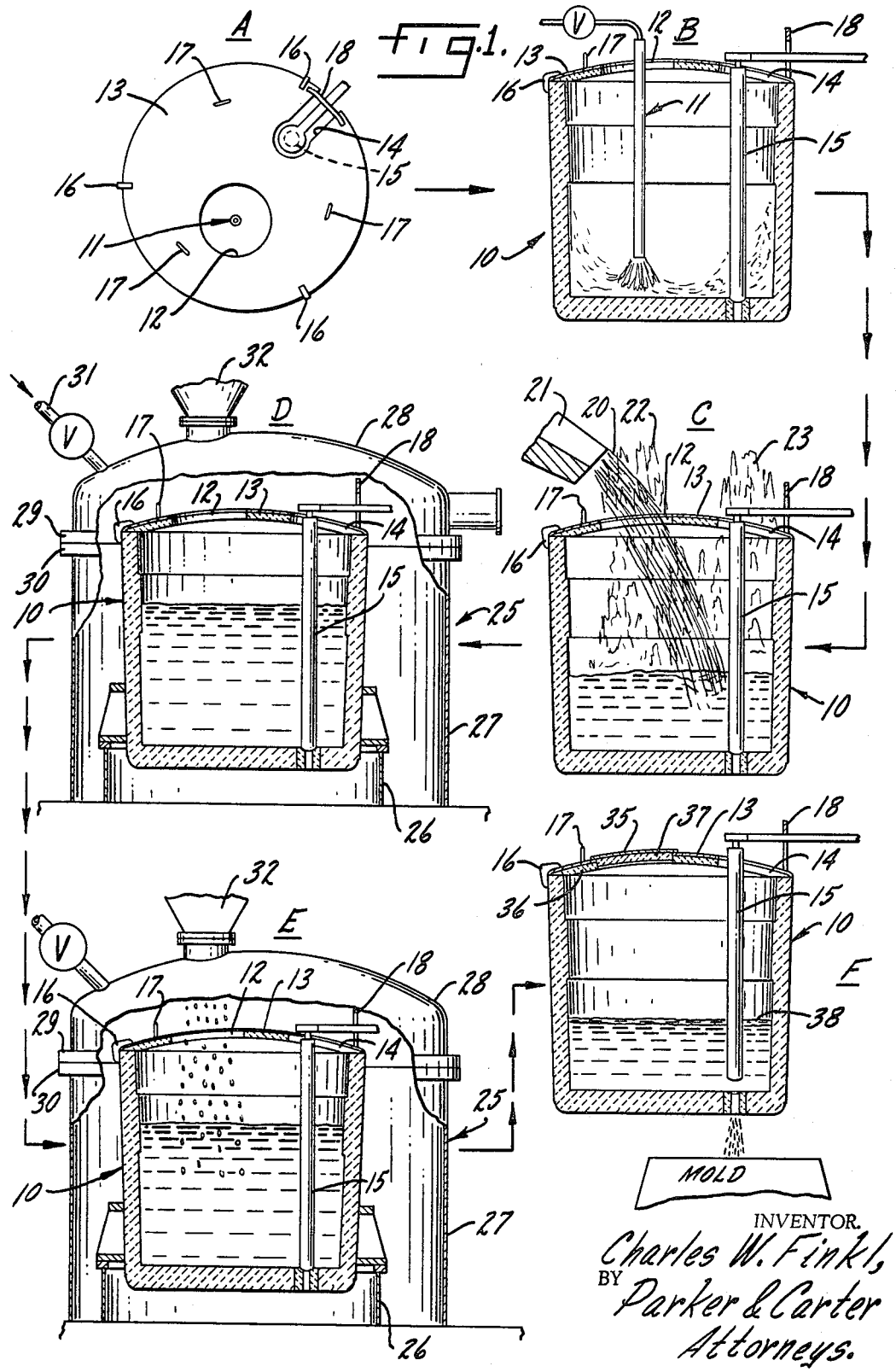

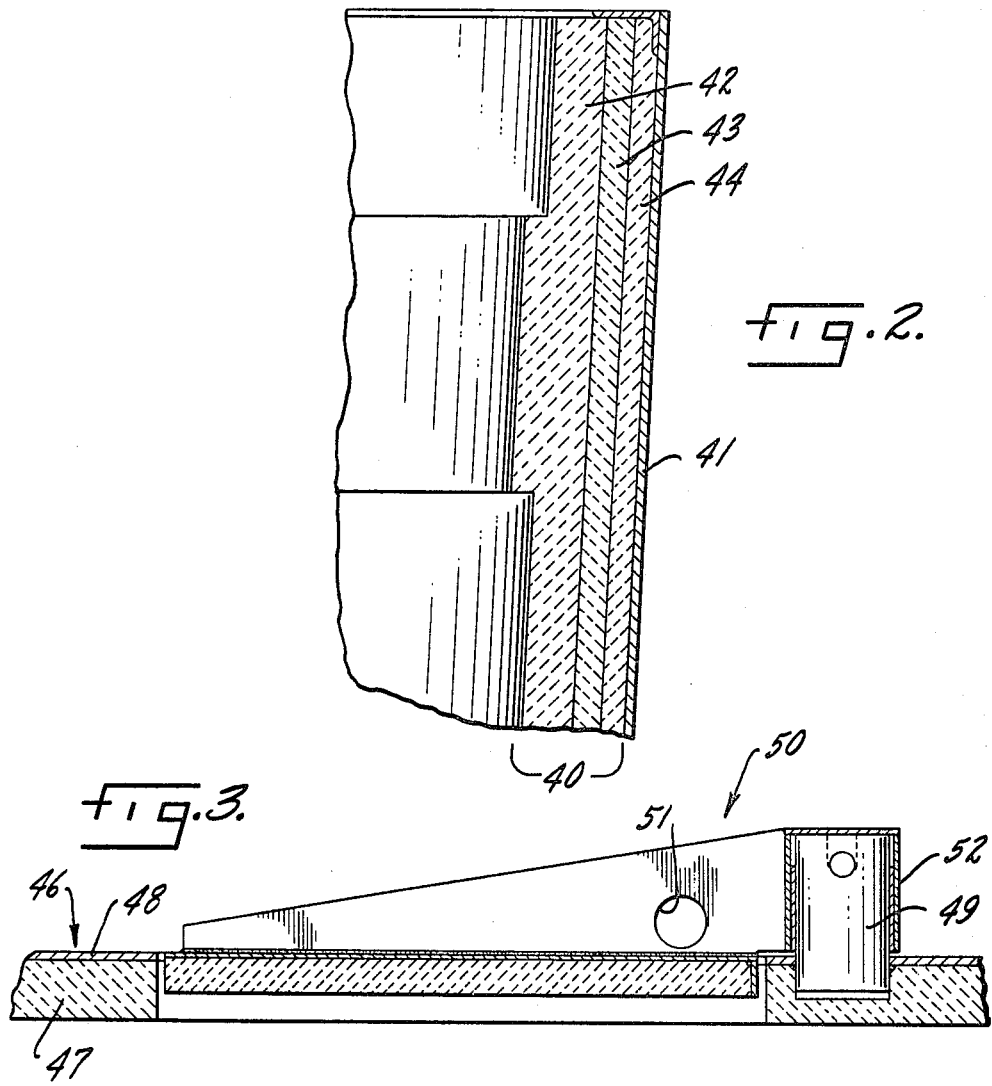

3,389,989
TREATMENT OF MOLTEN METAL
Charles W. Finkl, Chicago, Ill., assignor to A. Finkl & Sons Co., Chicago, Ill., a corporation of Illinois
Continuation-in-part of application Ser. No. 777,664, Dec. 2, 1958. This application June 3, 1965, Ser. No. 461,034
9 Claims. (Cl. 75—49)

This application is a continuation-in-part of application Ser. No. 777,664, filed Dec. 2, 1958, now Patent No. 3,236,635.

This invention relates to the production of high quality air melted steel and particularly to a method and apparatus for producing such steel on a commercial, large tonnage basis which has a very low final oxygen content.

The reduction of deleterious gases such as oxygen, hydrogen and nitrogen in steel is becoming of increased importance as steel specifications are tightened. In application Ser. No. 777,664, of which this is a continuation-in-part application, a very efficient and inexpensive method of removing deleterious gases is disclosed. The process there described is particularly well suited to the reduction of hydrogen, but actual experience has proven that the oxygen and nitrogen contents will also be lowered. It has now been discovered however that further improvement in the removal of oxygen can be accomplished by certain steps and procedures hereinafter set forth. To this end it has been discovered that by exposing the gas laden air melted steel to a certain gaseous-solid environment and, preferably, under certain chemical conditions, the oxygen can be removed in gaseous form thereby reducing the amount of oxygen present in the final product either in a combined or free form. The invention can best be described and understood in the terms of a field of commercial application to which the principles of the invention have been applied.

Electric furnace steel is essentially air melted steel since it is melted at substantially atmospheric pressure and under exposure to atmospheric conditions. The molten steel therefore has a relatively high included gas content in the molten, as melted condition. It has been established that the lower the carbon content the higher is the solubility of oxygen in the steel and accordingly initial or before tap oxygen contents of several hundred p.p.m. are common in low and medium carbon steels. Lower before tap levels can be achieved by working to a low FeO content in the second or reducing slag in the furnace. The present invention can even be of great benefit in shops that normally follow the above practice because it can shorten or eliminate the time consumed by the second slag which may involve one hour or more of furnace time.

It should be understood, however, that the specification of electric furnace melted steels is not intended to be restrictive of the type of steel used as a starting material in the practice of the invention. Actually the invention is applicable to steels which have been brought to a molten condition in such fashion that they contain undesirably large quantities of included deleterious gases irrespective of their method of formation. By way of contrast, the invention is not particularly applicable to steels formed by the vacuum arc remelt or consumable electrode process, or in the vacuum induction furnace, since in these processes the steel is melted in a very low vacuum and therefore has a relatively low oxygen content by the time it reaches the molten condition due in large measure to the film melting effect and the low partial pressure environment.

As set forth in the aforesaid application, the gases are removed from the steel by exposure of the steel to vacuum conditions. In order to promote the release of the deleterious gases at the surface of the melt stirring action may be induced within the steel. Concurrently with any externally induced stirring action, however, an internal stirring action is occurring which promotes the removal of oxygen from the steel. This internal action is a carbon-oxygen reaction within the steel bath in which carbon is continually combining with the oxygen to form CO which leaves as a gas. The lower the vacuum the more violent this reaction takes place. In effect, the vacuum promotes the carbon-oxygen reaction by causing the carbon to become an active oxygen-getter.

The oxygen in the steel is present from at least two sources. Firstly, the oxygen is present in the steel bath as an included deleterious gas which was contained within the steel at the termination of the melting process. Additional oxygen will be picked up during tapping. Secondly, tramp or parasitic gases may enter the steel melt after the melt leaves the electric furnace or other melting system. It is therefore apparent that anything which will reduce the formation and addition of the tramp or parasitic oxygen will enable the carbon and oxygen reaction to be carried out more efficiently since the quantity of included deleterious gas attributable to the melting process is a finite quantity which can be reduced by promotion of the carbon-oxygen reaction.

Prior to this invention the art has subjected air melted or similarly formed steels to vacuum treatment in a silica lined vessel, such as a ladle. Up to now a vessel lining which is composed essentially of a bloating type refractory containing 60 to 70% $SiO_2$ has been thought to be a preferred expedient for the following reasons.

It is well known that a silica type refractory has a much lower heat absorption characteristic than an alumina, magnesia or zirconia type refractory. A silica type refractory is not only a better insulator than alumina, magnesia and zirconia in the "as new" condition, but this property improves with bloating. In processes in which no significant amount of heat is added to the steel during treatment it is important that a refractory having low heat absorption and transfer characteristics be employed or the steel will lose too much heat during the vacuum treatment.

By way of contrast, the advantage of the low heat absorption and transfer characteristics of a silica type refractory is largely nullified when considering vacuum arc remelt or vacuum induction furnace processes because of the huge quantities of heat which are added to the steel in said processes.

Another factor dictating the use of silica brick in the vacuum treatment of air melted steels have to do with the teeming characteristics of the steel. Since silica type refractory has lower heat absorption and transfer characteristics, there is less temperature drop for a given length of time under vacuum as contrasted to identical sized vessels having an alumina, zirconia or magnesia type refractory. The silica brick therefore enables completion of the vacuum treatment at a higher final temperature than would be the case if the other more decay resistant types of brick were employed, and the higher the temperature of the steel the better are its teeming characteristics and the cleaner is the final product.

Economics has also dictated the choice of a silica type refractory in a vacuum treatment process using air melted steel in which no significant heat is added. If an alumina type refractory is employed for example it is necessary to substantially superheat the metal in the electric furnace prior to tapping in order to compensate for this increased heat absorption factor. This has the deleterious effects of causing the furnace lining to wear at a higher than normal rate, thereby increasing the process cost, and raising the process cost, and raising the $O_2$ content in the steel prior to tap, thereby putting an even greater initial load on the vacuum system. Furthermore, the higher the oxygen content the more violent the boil, and consequently the higher is the radiant heat loss.

Incidentally, the aforesaid problem of economics is non existent in systems in which substantial heat is added to the melt during treatment such as the vacuum induction furnace or consumable electrode processes. Steel made by those processes commands a premium price and the refractory cost, by comparison, is minor.

Finally, it is well known in the ingot foundry art that silica type refractories are bloating type refractories which are easier to install and maintain than non-bloating types. Since the alumina type refractory does not expand or bloat upon subjection to heat the metal is able to penetrate the crevices. When the skull is removed after completion of the heat there is a tendency to tear away the refractory due to the penetrations into the crevices.

It should also be noted that brick costs in the vacuum induction furnace and consumable electrode processes may be more easily absorbed because the price of the final product from these processes is much higher per pound than the price of the air melted product with which this invention is concerned.

It has now been discovered that the quantity of parasitic or tramp gases, particularly oxygen, can be drastically reduced and the carbon and oxygen reaction promoted without using silica refractory on an economic basis. This is accomplished by the performance of a controlled series of steps under carefully selected conditions, which steps and conditions will be hereinafter described.

Accordingly, the primary object of this invention is to provide a large scale production method and system for producing steel having a low final oxygen content from steel containing large quantities of included deleterious gas at the commencement of vacuum treatment.

The invention is illustrated more or less diagrammatically in the accompanying drawings, wherein:

FIGURE 1 is a schematic flow diagram illustrating the invention;

FIGURE 2 is a detail view of a portion of a receptacle usable in the invention; and FIGURE 3 is a detail view of an alternate form of structure for use during teeming operations.

Like reference numerals will be used to refer to like parts throughout the following description of the drawings.

A conventional ladle is indicated generally at 10 in FIGURES 1A and 1B. The ladle may be, for example, be of a size capable of holding approximately 35 tons of molten steel when filled to a depth of somewhere between two and four feet below the top of the ladle. As a matter of fact the ladle and vacuum system described in the aforesaid co-pending application may be taken as exemplary of the size and configuration of the system employed in the practice of the present invention.

A gas burner is indicated at 11 in FIGURE 1B. The burner is preheating the interior of the ladle to an elevated temperature which may for example be on the order of approximately 2000 degrees Fahrenheit although the invention may be carried out by heating the interior of the ladle to a point within a range of several hundred degrees spanning 2000 degrees Fahrenheit or even up to the safe marking temperature of the living. In some instances, particularly if moderate superheat has been employed, no preheating may be necessary. The burner 11 is inserted through a circular aperture 12 formed in ladle cover 13. A second aperture, in this instance a generally keyhole shaped slot 14, is formed in the periphery of the cover to provide access for a stopper rod or other teeming device 15. Suitable positioning lugs are indicated at 16, lifting eyes at 17, and the reinforcing structure at 18. Preferably the cover is used throughout the cycle to conserve the heat absorbed by the cover refractory. When in place, it slows radiation which is the greatest source of heat loss.

After preheating, the ladle, with the cover 13 in place, is moved to the tapping station shown in FIGURE 1C.

The stream of molten metal 20 discharged from the tapping structure 21 of an electric furnace or other source is tapped into the ladle through aperture 12. At this time the metal will contain large quantities of deleterious gases. That portion of aperture 12 surrounding the pouring stream 20, and the keyhole slot 14, provide flues for the escape of burning gases indicated generally at 22 and 23. The gases result from the combustion of the oxygen in the atmosphere within the ladle. The molten metal is therefore tapped into the ladle under a controlled, protective atmosphere.

After tapping, the ladle is transferred to a vacuum tank indicated generally at 25 in FIGURE 1D. The ladle is placed upon a suitable support 26 in the lower portion 27 of the tank, the upper portion 28 of the tank lowered in place, and a seal is formed between the abutting flanges 29, 30. A vacuum is then drawn through any suitable conduit, indicated generally at 31. Preferably, the vacuum is created by a steam ejector system which will be explained hereinafter in greater detail. A charge material addition container is indicated generally at 32. It will be noted that while the ladle is in the vacuum tank aperture 12 remains open, the aperture being so designed as to provide a tapping opening and an addition port beneath the charge material addition assembly 32.

Referring now to FIGURE 1E, it may be assumed that the 35 ton melt of low chrome-moly-nickel steel has been subjected to a vacuum on the order of one millimeter of mercury or less for a period of from ten to twenty minutes. Preferably, the metal at the time of placement within the vacuum tank did not contain any or at the most only very small quantities of intentionally added substances which are good deoxidizers under vacuum conditions. Aluminum and silicon are good examples but vanadium, manganese and exothermic chrome should likewise be absent as indicated in my copending applications, Ser. Nos. 176,493 and 186,569 of which this application is a continuation-in-part. FIGURE 1E represents that instant in the process at which charge materials are admitted to the melt. The charge material may be silicon and/or aluminum or compounds thereof, and possibly slag forming materials which will form a thin blanket over the surface of the melt. The slag blanket will protect the melt from reabsorption of deleterious gases from the atmosphere and also reduce the rate of heat loss.

The type of steel to which the invention may be applied does not appear to be critical. The results described herein have been achieved on many steels, including 4340 and FX steel which has a nominal composition of C, .50–.60; Mn, .60–.90; Si, .20–.35; Ni, .80–1.00; Cr, .80–1.15; Mo, .25–.35; U, .03–.05.

In FIGURE 1F, the ladle 10 has been removed from the tank and transferred to the teeming station. A closure plate 35 has been placed in aperture 12 to provide a substantially continuous heat radiation surface. It will be understood that the side of the cover 13 exposed to the heat of the melt is composed of refractory materials, as well as the underside 37 of plate 35. During teeming there is, of course, the opportunity for atmospheric air to make contact with the surface of the melt through the keyhole slot 14, but slag blanket 38 functions to prevent rapid absorption of deleterious gases from the atmosphere.

It is advantageous to use the same cover throughout the cycle from preheating to teeming since the cover is a heat sink.

Referring now to FIGURE 2 it will be noted that the ladle wall consists of a refractory portion 40 and a steel shell 41. The refractory portion is preferably composed of a plurality of layers 42, 43 and 44. The interior lining 42, which is exposed to the molten metal, is preferably composed of a refractory having a major portion of alumina, zirconia, or magnesia. Alumina is the preferred material since it is not as subject to spalling due to thermal shock as is magnesia, and zirconia is extremely expensive. A typical composition of layer 42 is indicated below.

| Component: | Percent |
| --- | --- |
| Al₂O₃ | 83.5–86.5 |
| SiO₂ | 8.5–11.0 |
| TiO₃ | 2.6–3.5 |
| Fe₂O₃ | 1.0–2.0 |
| CaO | .08–.11 |
| MgO | .15–.25 |
| Alkalies | .15–.20 |

It will be noted that an extra course of bricks have been provided at the slag line since this is the area where refractory erosion occurs most rapidly.

The next layer 43 is preferably a layer of porous, light weight, insulating brick, a typical composition of which is set out below.

| Component: | Percent |
| --- | --- |
| SiO₂ | 74–78 |
| Al₂O₃+TiO₂ | 18.5–23.5 |
| Fe₂O₃ | 1.5–2.5 |
| CaO | 0–.3 |
| MgO | 0–.2 |
| Alkalies | .3–.5 |

The interior high alumina lining may be about 4½ inches thick and the insulating brick lining may advantageously be about 2½ inches thick.

The tank or safety lining 44 may be formed from a conventional silica ladle brick, a typical composition of which is set out below.

| Component: | Percent |
| --- | --- |
| SiO₂ | 65.50 |
| Al₂O₃ | 27.30 |
| Fe₂O₃ | 3.45 |
| CaO | .55 |
| MgO | .47 |
| Alkalies | 2.43 |

The thickness of this lining, like the thickness of the interior lining, may be varied without departing from the scope of the invention. In the system described as exemplary in this application, a lining of about 2 inches in thickness has proven to be advantageous.

The insulating fire brick lining 43 and the tank or safety lining 44 may be reversed with slightly less satisfactory results due to the slightly higher heat dissipation from the silica ladle brick. That is, the above described preferred construction reduces heat loss due to absorption and transmission to a minimum.

Referring now to FIGURE 3, an alternate construction for the cover 35 of FIGURE 1F has been disclosed. In this instance, the cover 46 is formed as a flat disc having interior refractory lining 47 and exterior shell 48. A pivot post is indicated at 49. A plug plate assembly is indicated generally at 50. Preferably, the plug plate assembly includes a lifting eye 51 which enables an overhead crane or other lifting means to slip the cylindrical cap 52 over the stub pivot 49.

Although an exemplary construction has just been illustrated and described, it will at once be apparent that modifications and variations may be made without departing from the spirit and scope of the invention.

For example it may under some circumstances, be advantageous to eliminate the cover 13 and vary the process steps accordingly. Thus the ladle may be tipped on its side with its open end facing a refractory surface, such as a wall of the melt shop. The burner may then be inserted through the wall or around the rim of the sidewall of the ladle. This procedure may be preferable when the disc type plate of FIGURE 3 is employed because a disc type plate, which is not as strong as the slightly arched cover 13, is thereby subjected to elevated temperatures for a shorter period of time.

Further, it is not essential that cover 13 be maintained on the ladle during teeming or even during tapping but this is a preferred step because of the benefits earlier mentioned.

Finally, the three thickness ladle lining need not be employed on the bottom of the ladle. It might for example be desirable under some circumstances to eliminate the insulating lining 43 at the bottom of the ladle.

The above described series of steps will save about thirty to fifty degrees of temperature drop depending on the heat size. Reduction of the heat drop by this amount can be of crucial importance in commercial operations because this heat saving may represent the difference between a commercially economical and a commercially uneconomical process.

The molten steel contains as is generally understood in the industry, a substantial quantity of alloying material of which carbon is the most common. The invention has been particularly applied to what is generally referred to as medium carbon steels, specifically, heats containing from .33 to .64 carbon. It is contemplated however, that the invention is applicable to steels having carbon in the range of from .15 to 2.25%. The field of most common application and which the process can be expected to be most effective, encompasses steels having carbon in the range of .20 to 1.00 or more. For purposes of this description the medium carbon range is considered to extend from about .30 to about .70 carbon. For SAE 52100 steel such carbon range will be from about 0.95 to about 1.10. Other alloying elements such as nickel, chromium, molybdenum, vanadium, or manganese or a combination of one or more of these elements will likewise be present. Other elements may be present in significant amounts with lesser frequency than the above mentioned elements.

If the equipment and time permits, it is desirable that the steel be exposed to a vacuum on the order of about 1 mm. of Hg or less. Actual operation on medium carbon steels has taken place in the range of about 200 to about 500 microns of Hg for a substantial portion of the time the steel was under 1 mm. Hg, which in turn was a substantial portion of the time the steel was exposed to vacuum conditions.

At the commencement of the vacuum treatment, the molten steel should however contain an insufficient quantity of a material or materials sufficiently active to deoxidize the molten steel to an appreciable extent prior to further processing, in other words, the steel should contain no elements which combine with oxygen more avidly than does carbon at atmospheric and reduced pressures.

In copending application Ser. No. 777,664, the fact is disclosed that the degassing operation is considerably hindered by the presence of aluminum (or other active deoxidizers). Aluminum is a deoxidizer. It tends to combine with oxygen to form Al₂O₃. If the oxygen in the melt combines with aluminum, the carbon monoxide boil, which is an important stirring agent, is considerably reduced. It should be understood for example, also as disclosed in copending application Ser. No. 777,664, that degassing is promoted by the carbon monoxide boil which results from the combination of free oxygen in the melt. As the CO bubbles upwardly it creates a stirring effect which reduces stratification in the melt.

Accordingly, degassing should be carried out in the absence of aluminum, silicon or other active deoxidizers. When deoxidizers sufficiently active to deoxidize the molten metal to an appreciable extent, such as aluminum or silicon, or both, are added, they should be added to the melt after the removal of a substantial quantity of the included deleterious gases. Under certain conditions the above considerations likewise apply to the addition of manganese, vanadium and chrome.

It is impossible to define with accuracy the precise moment when the deoxidizers should be added. As those skilled in the art of vacuum treatment of steels readily appreciate, the pumping curve begins to taper off and a relatively constant vacuum tends to become established in most instances after several minutes at a low vacuum. It is when this condition prevails that addition of deoxidizers may be advantageously made. A graphic example of this condition may be seen in FIGURE 4 of Patent 3,071,458. The most advantageous moment will vary from installation to installation and will depend on many factors, such as size of the heat and capacity of the vacuum system. In any event it is obvious to those skilled in the art that when the relatively stable vacuum has been reached a substantial quantity of the included deleterious gases have been removed, and this holds true even if the charge is melted or added under vacuum. It is thought that over 50%, and perhaps as much as 67%, of the deleterious gases have been removed but these figures are impossible of confirmation in the present state of the art because of the difficulties associated with sampling for gas analysis under those conditions. It will also be obvious that should the deoxidizing materials be added earlier it may still be said that a substantial quantity of the deleterious gases have been removed, using the word "substantial" in the sense of more than an insignificant amount.

As soon as the vacuum treatment has been completed, the material may be immediately cast into a mold. One of the great advantages of my process is that no special handling in flake prevention treatment is needed after stripping the ingot from its mold. Preferably the degassed metal is teemed directly into a chill mold such as an ingot mold. The ingot mold may be preheated as is usual in many melt shops. Commonly the molds are preheated to temperatures up to 500° F., and occasionally somewhat higher. 300° F. is a common preheating temperature. Whether or not the metal is teemed into a receptacle which has been preheated it is considered that the metal undergoes a fast cool. The term fast cool is used in contrast to a slow cool as illustrated for example by cooling the metal, in a receptacle, in a vacuum environment or in an inert atmosphere. Teeming into a sand mold, a graphite mold or other conventional receptacles which may have some degree of preheating applied to them are likewise included within the ambit of a fast or natural cool.

Set out below is a table setting forth various examples of commercial sized heats of medium carbon low alloy steels which have been treated in accordance with the invention.

heats will provide a much more manageable boil condition.

From the above facts, it will be noted that the use of a high alumina refractory enables the operator to employ a smaller ejector system to reach a given final pressure, or to attain a lower absolute pressure with the same ejector system as contrasted with a silica refractory process.

A fact of particular importance in this process is that substantial quantities of heat need not be added to the melt during the vacuum treatment. Preheating the ladle is helpful in reducing the effect of thermal shock and heat absorption by the refractories from the molten metal, but after the ladle has been filled the process may be completed without the addition of any substantial quantities of heat.

It should also be noted that the conventional forced or induced stirring processes are considered to be processes within the terms of this specification. The primary purpose of forced stirring is to create a stirring effect within the body of molten metal which aids in exposure of remote portions of the steel to the vacuum at the surface. While some heat may be added by these stirring processes, it appears that the quantity of heat added is incapable of slowing the rate of temperature drop to any significant extent. By way of contrast processes in which substantial amounts of heat are added are the consumable electrode or vacuum arc remelt and vacuum induction furnace processes.

It is also of importance that the melt go into the vacuum tank with the least practical quantities of active deoxidizers such as aluminum and silicon. Since aluminum and silicon are more active oxygen getters than carbon under vacuum, they will combine with oxygen in the melt and form oxides which will be present in the final product as undesirable inclusions. If on the other hand the melt contains a minimum quantity of substances which are more active oxygen getters than carbon, the CO boil will proceed satisfactorily and the oxygen content will be drastically lowered.

It should also be noted that the entire process is carried out in a single vessel, here a ladle, although it will be understood that within the scope of the art other suitable recepacles may be employed. Since the conditions under which the present invention function are rather critical it is advantageous, though not essential, that the process be completed in a single receptacle wherein the metal may

| Heat | Grade | Weight, Tons | Final, C (percent) | Pre-Vac., C (percent), After Additions | Made or Ladle Anal., C (percent) | Final, H[1] (p.p.m.) | Before Tap, O[1][2] (p.p.m.) | Final, O[1][3] (p.p.m.) | Heat | Time at Approx. 1 mm. Hg or Less, min. |
|---|---|---|---|---|---|---|---|---|---|---|
| 134,732 | FX | 32.0 | .54 | .551 | .58 | 1.5 | ---- | 16 | 134,732 | 8½ |
| 134,962 | 4340 | 33.0 | .330 | .380 | .40 | 1.5 | 87 | 13 | 134,962 | 8 |
| 134,980 | 3435 | 30.5 | .330 | .376 | .330 | 1.8 | 74 | 15 | 134,980 | 8 |
| 234,632 | FX | 24.0 | .550 | .367 | .560 | 1.1 | 113 | 25 | 234,632 | 12 |
| 234,924 | FX | 32.0 | .595 | .614 | .640 | 1.2 | 65 | 24 | 234,924 | 12 |

[1] H and O values are average of 2 or more readings.  [2] Pin tube samples.  [3] Solid core samples.

In all of the above heats a ladle having a metal contacting lining which contained approximately 85% alumina was employed.

The use of high alumina refractory will be particularly advantageous when vacuum treating low carbon heats. The lower the carbon content the more oxygen the metal can contain, and the greater the oxygen content the more violent the boil under vacuum conditions. If a silica type refractory is employed in lieu of a high alumina or other equivalent refractory, it may be necessary to either kill the boil by the addition of deoxidizers prior to vacuum treatment, or to use a less effective vacuum. The combined effect of oxygen present from the disassociation of the silica refractory and the oxygen in the steel may cause too violent a boil for completely effective treatment to be carried out. The use of a high alumina or equivalent refractory in connection with low carbon be maintained in a compact mass since such a procedure has the most desirable heat transfer characteristics.

An example of how the use of an alumina refractory in lieu of a silica refractory will make possible the production of a commercially acceptable product is given below.

The carbon monoxide produced as a result of the decomposition of the silica goes into the vacuum system. If a carrier agent or purgent, such as dry air or one of the inert gases, is additionally being bubbled through the molten metal as disclosed in my copending application Ser. No. 777,664, filed Dec. 2, 1958, of which this application is a continuation-in-part, the combined total of gas from the purging agent, the carbon monoxide resulting from breakdown of the silica type brick, the gas in the melt, and the gases present in the brick may so overload the ejector system as to cause it to become unstable, or in other words, for the pressure to rise. As the pressure rises the degassing effect is decreased. Even if the combined total of gases, whether or not a carrier agent is included, is not sufficient to cause instability of the ejector system, the parasitic load given off by the ladle refractory will preclude a conventional sized ejector system from creating a vacuum much, if any, below the range of 1 to 2 millimeters of the mercury in the time available. The time available of course is the time that elapses before the metal reaches the teeming temperature, and is dependent on many factors including tap temperature, boil, handling techniques, and the heat conservation characteristics of the degassing plant. This vacuum is quite often insufficiently low to produce the high quality steel described above. It is known, for example, that the amount of gas removable from a quantity of molten steel is dependent upon the pressure above the steel. Thus, there is a theoretical limit below which the gas content of the melt will not fall, or at least there will be very little effect on the gas content no matter how long the steel is held at the given vacuum. In addition, decomposition of the ladle brick quite frequently forms FeSi.

It should also be noted that the vacuum level determines the driving force acting to remove the deleterious gases. Therefore, the lower the pressure, the shorter the cycle may be when this factor only is considered. However, the lower the pressure the greater the boil and the greater the boil, the more rapid the heat loss. In addition, the greater the boil, the greater the refractory decay and the greater the formation of CO. This further tends to increase the boil. As a consequence, the alumina or equivalent type refractory becomes very desirable for very low pressures, such as 500 microns or below.

Even the addition of one or more conventional sized, or larger, ejectors to the system mentioned above may not further reduce the included gas content because the combined total of CO, and parasitic load from the silica type brick decomposition, and the gas in the steel (after the chamber and ladle gases have been removed) will exceed the capacity of the additional stage or stages. Additional pumping capacity sufficient to properly handle the gas load will require a huge additional capital investment. In operation more steam and more room will be required which may be impossible to provide.

Further, since the rate of decomposition of alumina, magnesia and zirconia is less than that of silica, the quantity of gas given off per unit of time is much lower. As the vacuum is lowered, improvement over silica type brick becomes even more pronounced. As a result, a fifth or a fifth-and-sixth stage may be added to a conventional 4-stage steam ejector system which thereby enables the vacuum to be lowered to approximately 30 to 50 microns in the case of a 5-stage system, or to 5 microns or below in the case of a 6-stage system. Such vacuums are sufficiently low to achieve final included gas contents of less than 1 p.p.m. hydrogen and 20 p.p.m. oxygen or less on .30 to .50 C steels, and 5–10 p.p.m. on 1.0 C steels and the number of inclusions per unit area should be well within the tolerable limit.

Specifically, a ladle having a volume of 60 tons containing approximately 35 tons of a medium carbon chrome-nickel-molybdenum electric furnace steel, such as FX, substantially identical to the steel described in my copending application may be placed in a vacuum system of approximately 1200 cubic feet, the vacuum system having a 6-stage steam jet ejector system.

The first four stages may be substantially identical to the system described in my aforementioned copending application. The ladle may be of conventional construction. With six stages the system should preferably be condensing in order to handle the large volume of steam, and preferably a condenser will be placed after the third stage. The fourth stage should be capable of handling approximately 200 lbs. of equivalent air per hour, the fifth stage, 30 lbs. of equivalent air per hour, and the sixth stage, 5 lbs. of equivalent air per hour. The 4-stage may run at a vacuum in the range on the order of about 100–500 microns of mercury utilizing an alumina brick refractory. The 5-stage may desirably operate in the range of 30–50 microns, and the 6-stage at 5–10 microns or below.

Experience has shown that silica brick may give off as much as 100 lbs. of equivalent air or more per hour. It will readily be seen from this fact that the fifth and sixth stages of the above system could not be used since they could not handle this weight of gas. Therefore, even if the fifth and sixth stages were made a part of the system, the fourth stage would determine the working vacuum.

In operation with a 5 or 6-stage system, the stages should be cut in successively. For example, a number of stages, less than all, which comprise in effect a large capacity and hogging jets, may be cut in and maintained until the great bulk of the gases present are removed. At that time the remaining high capacity low vacuum stage or stages will be cut in to carry the vacuum down from 200 microns of mercury to the range of about 100–10 microns of mercury, and preferably in the range of 10–5 microns of mercury.

The time of treatment may be varied. The time of treatment will be determined by the maximum tolerable temperature drop limitation of the steel, which, in effect, is the time it takes the steel to cool to a temperature below which it is too cold to teem properly. Those skilled in the art will be readily able to judge the time since safe teeming temperatures of degassed steel are known or may be easily determined.

With the same system and operating conditions, the attainable vacuum may be not much, if any, below the range of 300–400 microns if silica brick is used as a lining, irrespective of whether 4, 5 or 6 conventional stages are employed. By utilizing alumina, magnesia and zirconia brick, or other high refractory brick, the additional stages will be effective and the aforementioned extremely low vacuums will be obtained. By high refractory I refer to the resistance to decay of the brick under vacuum when exposed to high temperatures and in contact with molten metal or slag. As will be apparent from the foregoing discussion, the refractory surface in contact with the molten metal should include a major amount of a refractory more stable than silica.

It has been noted that steels which are relatively low in silicon very actively reduce the $SiO_2$ of the treatment vessel refractory. Thus, steels having a before tap silicon analysis of less than .20 very actively attack the silica refractory of the treatment vessel and an alumina refractory is essential for good degassing results on such steels. Steels having a before tap silicon content of .30 or above have poor degassing characteristics. Therefore it is preferred that the silicon content be no greater than approximately .20 before the vacuum treatment takes place.

I claim:
1. Apparatus for reducing the oxygen content of molten steel containing an undesirably high quantity of oxygen in an initial molten condition, said apparatus including
   a molten metal receptacle,
   said receptacle having an internal configuration proportioned to provide a low surface to volume ratio of a melt of steel contained therein,
   the upwardly extending metal contacting surfaces of said receptacle being composed of a refractory material which includes a major proportion of alumina, zirconia, or magnesia, and a maximum of 35% silica,
   a cover member adapted to be carried by the receptacle,
   said cover having means forming a passage for the admission of materials to the metal in the receptacle when the cover is in place, and
   a filler plate having a contour complementary to the passage formed in the cover whereby said plate, when in position blocking the admission passage, forms a substantially continuous heat reflecting surface above the metal.

2. The apparatus of claim 1 further characterized in that the cover is contoured to present a curved reflecting surface to the receptatcle, the maximum depth of contour occurring substantially in the middle of the cover.

3. In a production method of lowering the oxygen and inclusion content of commercial steel by vacuum treatment to produce quality steel, the steps of forming, as a starting material, molten metal by exposing charge material to a source of arc heat under substantially atmospheric pressure conditions to thereby provide molten metal containing an undesirably high deleterious gas content in the as melted condition, said molten metal containing an alloying quantity of carbon, no active deoxidizer in an amount sufficient to preclude the carbon monoxide boil during the later subjection of the molten metal to vacuum, and alloying material in addition to carbon which will not materially inhibit a subsequent carbon monoxide boil, subjecting the molten metal to a vacuum which will effectively degas it, maintaining the steel, while subjected to the vacuum, in contact with a refractory surface composed of a refractory which is more stable than silica under vacuum conditions selected from the group consisting essentially of magnesia, zirconia, and an alumina type brick having an alumina content of from about 65%–90%, and adding active deoxidizers after the oxygen content has been lowered to a desired level.

4. The production method of claim 3 further characterized in that the active deoxidizers are added under vacuum.

5. The method of claim 3 further including the step of heating the refractory prior to contact with the molten steel.

6. The method of claim 3 further including the step of reducing the rate of heat transference from the surface of the melt by the maintenance of a refractory reflecting surface over the melt surface during the vacuum treatment.

7. The method of claim 3 further including the step of stirring the melt during subjection to the vacuum.

8. The method of claim 7 further characterized in that the melt is stirred by the upward passage of a gas.

9. The method of claim 8 further characterized in that the gas is selected from the group consisting of the inert gasses, and dry air.

References Cited

UNITED STATES PATENTS

| | | | |
|---|---|---|---|
| 963,652 | 7/1910 | Reynolds | 75—49 X |
| 1,277,523 | 9/1918 | Yensen | 75—49 |
| 2,054,923 | 9/1936 | Betterton et al. | 75—49 |
| 2,776,204 | 1/1957 | Moore | 75—49 |
| 2,852,246 | 9/1958 | Janco. | |
| 2,961,722 | 11/1960 | Lilljekvist et al. | 22—84 |
| 2,993,780 | 7/1961 | Allard | 75—49 |
| 3,083,422 | 4/1963 | Finkl | 75—49 |
| 3,084,038 | 4/1963 | Finkl | 75—49 |

OTHER REFERENCES

"Refining Metals Electrically," by Larry J. Barton, pages 314–317, The Penton Publishing Co., Cleveland, Ohio, 1926.

"Vacuum Melting," Report by Students in Harvard Business School; Frank D. Jacobs Co., Philadelphia, Pa., 1957, page 38.

Ziegler et al.: "Proc. of Inst. of Metals Div.," A.I.M.E., 1928, pages 544, 548, 549.

Ziegler: "Trans. of Iron and Steel Div.," A.I.M.E., 1929, pages 428, 430, 440–442, 444, 445.

HYLAND BIZOT, *Primary Examiner.*

DAVID L. RECK, *Examiner.*

H. W. TARRING, *Assistant Examiner.*